United States Patent [19]

Holmgren

[11] Patent Number: 5,409,597
[45] Date of Patent: Apr. 25, 1995

[54] HYDROCARBON CONVERSION PROCESS USING A PILLARED CLAY CONTAINING FLUORIDED PILLARS

[75] Inventor: Jennifer S. Holmgren, Bloomingdale, Ill.

[73] Assignee: UOP, Des Plaines, Ill.

[21] Appl. No.: 291,640

[22] Filed: Aug. 17, 1994

Related U.S. Application Data

[63] Continuation-in-part of Ser. No. 133,939, Oct. 12, 1993.

[51] Int. Cl.$^6$ .......................... C10G 47/04; C07C 4/06
[52] U.S. Cl. .................................... 208/111; 208/134; 585/375; 585/446; 585/653; 585/709
[58] Field of Search ........................ 208/120, 111, 135; 585/709, 375, 446, 653

[56] References Cited

U.S. PATENT DOCUMENTS

| | | | |
|---|---|---|---|
| 3,965,043 | 9/1974 | Stridde | 252/455 R |
| 3,979,331 | 9/1976 | Stridde | 252/441 |
| 4,499,319 | 2/1985 | Ballantine et al. | 585/467 |
| 4,605,806 | 8/1986 | Ballantine et al. | 585/467 |
| 4,957,889 | 9/1990 | McCauley | 502/65 |
| 5,059,568 | 10/1991 | McCauley | 502/65 |

OTHER PUBLICATIONS

J. M. Adams, *Applied Clay Science*, 2, pp. 309–342 (1987).
Butruille et al., *J. of Catalysis*, 139, 664–678 (1993).

*Primary Examiner*—Asok Pal
*Assistant Examiner*—Bekir L. Yildirim
*Attorney, Agent, or Firm*—Thomas K. McBride; Eugene I. Snyder; Frank S. Molinaro

[57] ABSTRACT

Hydrocarbon conversion processes are disclosed which are catalyzed by novel pillared clay compositions. The clay contains pillars which are at least partially fluorided. These pillars are metal fluoro hydroxy cations where the metal can be Al, Zr, Si/Al, Ti or Cr. The clays which can be pillared with these pillars are the smectite clays which include hectorite and beidellite along with synthetically prepared smectite clays. These clays are prepared by pillaring the clay, followed by calcination and then treatment with a fluoride salt such as ammonium bifluoride.

9 Claims, No Drawings

HYDROCARBON CONVERSION PROCESS USING A PILLARED CLAY CONTAINING FLUORIDED PILLARS

CROSS REFERENCE TO RELATED APPLICATIONS

This application is a continuation-in-part of prior copending application U.S. Ser. No. 08/133,939 filed on Oct. 12, 1993 which is incorporated by reference.

FIELD OF THE INVENTION

This invention relates to a hydrocarbon conversion process using a pillared clay composition in which the pillars are fluorided pillars. The clay is any of the smectite class of clays such as hectorite or beidellite.

BACKGROUND OF THE INVENTION

Clays are composed of infinite layers (lamellae) of metal oxides and hydroxides stacked one on top of the other. These layers or sheets are composed of tetrahedrally coordinated cations which are linked through shared oxygens to sheets of cations octahedrally coordinated to oxygens and hydroxyls. When one octahedral sheet is linked to one tetrahedral sheet a 1:1 layered structure is formed as in kaolinite, whereas when one octahedral sheet is linked to two tetrahedral sheets, a 2:1 layered structure is produced as in beidellite. Anionic charges on the tetrahedral layers (usually siliceous layers) are neutralized by cations such as $Na^+$ or $Ca^{+2}$ in the interlamellar spaces. These cations can be exchanged with other cations.

Some of the clays are swellable, i.e., they swell or expand when placed in water or other solvents. These clays include the smectite group of clays which are 2:1 layered clays. Included in the smectite group are montmorillonite, beidellite, nontronite, hectorite, saponite, Laponite TM, and sauconite. The clay layers in these swellable clays can be propped open or pillared with large cations such as $Fe^{+3}$, $Cr^{+3}$ or with metal hydroxy polymer cations such as $(Al_{13}O_4(OH)_{24}(H_2O)_{12})^{+7}$ or $(Zr(OH)_2.4H_2O)_4^{+8}$.

Pillared clays are known to catalyze numerous reactions such as alkylation, cracking, ester formation, dimerization, oligomerization, etc. A review of the reactions catalyzed by pillared clays may be found in an article by J. M. Adams, *Applied Clay Science*, 2, pp. 309–342 (1987). Of these reactions, alkylation has received considerable attention. For example, U.S. Pat. No. 4,499,319 discloses layered clays such as montmorillonite which have been ion-exchanged with metal cations such as chromium and aluminum, which are used to alkylate aromatic compounds. Other examples include U.S. Pat. No. 4,605,806 which discloses a hydrogen ion-exchanged pillared clay; U.S. Pat. No. 3,965,043 discloses a metallic cation exchanged trioctahedral 2:1 layer-lattice smectite-type clay and U.S. Pat. No. 3,979,331 which discloses a metallic cation exchanged synthetic hectorite-type clay useful for alkylating aromatic hydrocarbons.

It is also reported that the swellable clays can be fluorided and then pillared. For example, Butruille et al. in *J. of Catalysis*, 139, 664–678 (1993) disclose synthesizing a fluorided hectorite clay which is then pillared with an $Al_{13}$ polycation and subsequently calcined. The authors report enhanced catalytic activity for propylene alkylation relative to nonfluorinated smectite hosts.

In contrast to this art, applicant has prepared a pillared smectite clay in which the pillars have been fluorided. For example, a montmorillonite clay was pillared with aluminum chlorohydrate (ACH), calcined and then treated with a fluoride salt such as ammonium fluorosilicate. Activity testing shows that the fluorided pillared clay of this invention has enhanced activity versus a fluorided clay that has been pillared.

SUMMARY OF THE INVENTION

As stated, this invention relates to a hydrocarbon conversion process using a pillared clay in which the pillars have been fluorided. Accordingly, one embodiment of the invention is a hydrocarbon conversion process comprising contacting a hydrocarbon feed under hydrocarbon conversion conditions with a catalyst to give a hydroconverted product, the catalyst comprising a smectite clay having the empirical formula

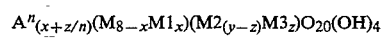

where A is a counter ion selected from the group consisting of alkali metals, alkaline earth metals, secondary amines, tertiary amines, quaternary ammonium cations and quaternary phosphonium cations, n is the charge on said counter ion, M is silicon or germanium, M1 is a metal having a +3 oxidation state selected from the group consisting of aluminum, gallium, iron and chromium, x ranges from about 0 to about 1.8, M2 is a metal having a +3 or a +2 oxidation state, M3 is a metal having a +2 or a +1 oxidation state, y is 4 when M2 is a +3 metal or 6 when M2 is a +2 metal and z varies from about 0 to about 1.8, the smectite clay having between its layers pillars which are metal fluoro hydroxy polymer cations.

This and other objects and embodiments will become more apparent after a more detailed description of the invention.

DETAILED DESCRIPTION OF THE INVENTION

One essential element of the instant invention is a swellable clay. The swellable clays are the smectite clays (natural and synthetic) which include hectorite, beidellite, Laponite TM, nontronite, saponite, sauconite and montmorillonite. These clays are represented by the empirical formula

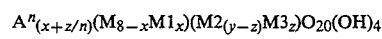

where A is a counter ion selected from the group consisting of alkali metals, alkaline earth metals, secondary amines, tertiary amines, quaternary ammonium cations and quaternary phosphonium cations, n is the charge on said counter ion, M is silicon or germanium, M1 is a metal having a +3 oxidation state selected from the group consisting of aluminum, gallium, iron and chromium, x ranges from about 0 to about 1.8. When M2 is a +3 metal it is selected from aluminum, gallium, iron and mixtures thereof. When M2 is a +2 metal, it is selected from magnesium, zinc, nickel and mixtures thereof. The M3 metal is selected from the group consisting of magnesium, zinc and lithium. The specific formulas for the various smectite clays are presented in Table 1.

TABLE 1

Formulas of Smectite Clays

| Clay Name | Formula |
|---|---|
| montmorillonite | $A_x Si_8(Al_{4-x}Mg_x)O_{20}(OH)_4$ |
| beidellite | $A_x(Si_{8-x}Al_x)(Al_4)O_{20}(OH)_4$ |
| nontronite | $A_x(Si_{8-x}Fe_x)(Fe_4)O_{20}(OH)_4$ |
| hectorite | $A_x(Si_8)(Mg_{6-x}Li_x)O_{20}(OH)_4$ |
| saponite | $A_x(Si_{8-x}Al_x)(Mg_6)O_{20}(OH)_4$ |
| sauconite | $A_x(Si_{8-x}Al_x)(Zn_6)O_{20}(OH)_4$ |
| Laponite TM | $A_x Si_8(Mg_{6-x}Li_x)O_{20}(OH)_4$ |
| SMC-1 | $A_x(Ge_{8-x}Al_x)Al_4 O_{20}(OH)_4$ |
| SMC-2 | $A_x(Si_{8-x}Ga_x)(Ga_4)O_{20}(OH)_4$ |

The value of x varies from about 0.2 to about 1.8.

These clays either occur naturally or can be synthesized. Usually the smectite clays are hydrothermally synthesized from a reaction mixture containing the required molar amounts of the desired metals. The reaction mixture contains reactive sources of the desired metals such as sodium aluminate, aluminum hydroxide, boehmite alumina, gibbsite alumina, aluminum isopropoxide, aluminum t-butoxide, colloidal silica, tetraethylorthosilicate (TEOS), tetramethylorthosilicate, gallium hydroxide, gallium chloride, gallium nitrate, germanium tetrachloride, germanium ethoxide, magnesium sulfate, magnesium fluoride, lithium fluoride, iron chloride, chromium chloride, zinc sulfate and zinc chloride. The counter ion is added as a salt or compound. Examples of the metal salts are sodium hydroxide, lithium hydroxide, potassium hydroxide, cesium hydroxide and calcium hydroxide. Examples of quaternary compounds are the hydroxide, chloride, iodide, bromide and carbonite salts of the following cations: tetramethylammonium; tetraethylammonium; tetrapropylammonium; tetrabutylammonium; tetra-t-butylammonium; tetrapentylammonium; tetraphenylammonium.; tetramethylphos-phonium; tetraethylphosphonium; tetrapropylphosphonium and tetraphenylphosphonium. Illustrative of the secondary and tertiary amines which can be used are di-n-propylamine, ethylbutylamine, tripropylamine, triethylamine, piperidine, 2-methylpyridine, di-n-pentylamine, choline and N'N-dimethylbenzylamine. The pH of the reaction mixture can range from about 5 to about 14 and the mixture reacted at a temperature of about 50° C. to about 250° C. under autogenous pressure for a time of about 2 hours to about 21 days to crystallize the desired clay.

Another necessary element of the instant invention is a metal hydroxy polymer cation which acts as a pillar to prop up the clay layers. The preparation of these metal hydroxy polymers is well known in the art. For example, one well known pillar is aluminum chlorohydrate (also known as aluminum chlorohydroxide), ACH, which is a polymeric aluminum complex having the empirical formula

$$Al_{2+n}(OH)_{2n}Cl_6$$

where n has a value of about 4 to 12. The preparation of this aluminum polymer is generally known to those skilled in the art. See, for example: Tsuitida and Kobayashi, *J. Chem. Soc. Japan* (Pure Chem. Sect.), 64, 1268 (1943). Inoue, Osugi and Kanaji, *J. Chem. Soc. Japan* (Ind. Chem. Sec.), 61, 407 (1958).

The ACH pillar can be modified to include one or more rare earth elements such as cerium, lanthanum, neodymium, europium, etc. The preparation of these rare earth modified ACH pillars is described in U.S. Pat. No. 4,952,544 which is incorporated by reference.

Basically, the ACH polymer is modified with the rare earth by adding a soluble rare earth salt, preferably a water soluble rare earth salt. Examples of rare earth salts are the nitrates, halides, sulfates and acetates. Preferred rare earth elements are cerium and lanthanum with cerium nitrate and lanthanum nitrate being the preferred salts. The rare earth is introduced into the polymer or oligomer structure by mixing the rare earth salt either in solution (water preferred) or as a solid with the ACH. The mixture is refluxed at a temperature of about 105° to about 145° C. for a time of about 24 to about 100 hours. The weight ratio of rare earth (expressed as oxide, e.g., $CeO_2$) to alumina ($Al_2O_3$) in the solution prior to refluxing is from about 1:52 to about 1:1.

Examples of other pillars are polymers or oligomers of zirconium, chromium, titanium, silicon and silicon/aluminum. Descriptions of oligomers or polymers of these pillaring materials can be found in the following references: 1) Si/Al—U.S. Pat. No. 4,176,090; 2) zirconia—*Clays and Clay Minerals*, 27, 119 (1979) and U.S. Pat. No. 4,176,090; 3) titania—U.S. Pat. No. 4,176,090; 4) chromium oxide—U.S. Pat. No. 4,216,188 and 5) silicon oxide—U.S. Pat. No. 4,367,163, all of which are incorporated by reference.

Having obtained the desired clay and pillar or pillar precursor, the clay is now pillared by means well known in the art such as described in U.S. Pat. No. 4,950,544 which is incorporated by reference. Usually the clay is added to a solution containing the pillar, stirred, filtered, redispersed with water (one or more times), isolated, dried and calcined at about 300° C. to about 800° C. for a time sufficient to fix the pillars, usually from about 30 minutes to about 12 hours.

The pillars of the clay are now fluorided by treating the pillared clay with a solution of a fluoride compound. Examples of fluoride compounds include ammonium fluorosilicate, ammonium bifluoride and ammonium fluoride. The fluoriding process involves taking the calcined pillared clay and dispersing it in water to form a slurry. To this slurry, there is added a solution (aqueous) of the desired fluoride compound. The fluoride containing slurry is now heated with stirring. The slurry can be heated to evaporate the water which effectively impregnates the fluoride onto the pillars (impregnation method). Alternatively, the slurry is heated up to a temperature of about 60° C. to about 90° C. for a time of about 30 minutes to about 6 hours without evaporation of the water (slurry method). If the water is not evaporated, the slurry is filtered and the clay is washed with from about 5 liters to about 20 liters of water. Regardless of whether the slurry or impregnation method is used, the isolated clay is dried and then calcined at a temperature of about 300° C. to about 600° C. for a time of about 1 hour to about 16 hours. This process results in some or all of the hydroxyls on the oligomers being substituted with fluorides. The composition which is derived from this invention is useful as a catalyst or as a support for metals which are themselves catalysts. Thus, without any further modifications, the composition of this invention can be used to catalyze reactions such as alkylation, cracking, oligomerization, isomerization and transalkylation. Additionally, a metal component (either as the metal or as the metal oxide) may be deposited on the composition to provide additional or different catalytic properties. The metal which makes up the metal component may be selected from the group consisting of the Group IIIA, IIIB, IVB, VIII metals, molybdenum, tungsten and mixtures thereof.

The metal component may be deposited on the composition, which acts as a support, in any suitable manner known in the art. One method involves impregnating the support with an aqueous solution of a decomposable compound of the metal or metals. By decomposable is meant that upon heating the metal compound is converted to the metal or metal oxide and the release of byproducts. Illustrative of the decomposable compounds of said metals are cobalt chloride, cobalt nitrate, cobalt acetate, cobalt sulfate, iron chloride, iron nitrate, iron acetate, iron sulfate, nickel chloride, nickel nitrate, nickel acetate, nickel sulfate, ammonium chloroplatinate, chloroplatinic acid, bromoplatinic acid, dinitrodiamino platinum, sodium tetranitroplatinate, rhodium trichloride, hexaamminerhodium chloride, rhodium carbonylchloride, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, ammonium hexachloroiridate (III), ammonium aquohexachloroiridate (IV), ruthenium tetrachloride, hexachlororuthenate, hexaammineruthenium chloride, osmium trichloride, ammonium osmium chloride, ammonium paramolybdate, ammonium tungstate, aluminum chloride, aluminum nitrate, boric acid, gallium nitrate, gallium trichloride, indium chloride, indium nitrate, thallium acetate, scandium nitrate, lanthanum chloride, lanthanum nitrate, yttrium chloride, yttrium nitrate, titanium trichloride, zirconium tetrachloride, zirconium sulfate, and hafnium chloride. When more than one metal is desired, the metals can be in a common aqueous solution or in separate aqueous solutions. When separate aqueous solutions are used, impregnation of the support can be performed sequentially in any order. Although the concentration of metal component can vary substantially it is desirable that the catalyst contain a concentration of the metal component as the metal from about 0.1 to about 30 weight percent of the support and preferably from about 1 to about 15 weight percent. A preferred impregnation procedure involves the use of a steam-jacketed rotary dryer. The support is immersed in the impregnating solution containing the desired metal compound contained in the dryer and the support is tumbled therein by the rotating motion of the dryer. Evaporation of the solution in contact with the tumbling support is expedited by applying steam to the dryer jacket. The resultant composite is allowed to dry under ambient temperature conditions, or dried at a temperature of about 80° to about 110° C., followed by calcination at a temperature of about 400° to about 650° C. for a time of about 1 to about 4 hours, thereby converting the metal compound to the metal or metal oxide. As stated, the composition of this invention with or without an additional metal component can be used as an alkylation catalyst. The conditions necessary to carry out alkylation of aromatic compounds are well known and are disclosed, for example, in U.S. Pat. Nos. 3,965,043 and 3,979,331 which are incorporated by reference. Generally the process can be carried out in a batch type or a continuous type operation. In a batch type process, the catalyst, aromatic compound and alkylating agent are placed in an autoclave and the pressure increased, if necessary, in order to effect the reaction in the liquid phase. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° to about 200° C. The process is carried out for a time of about 0.5 to about 4 hours, after which the product is separated from the starting materials by conventional means.

If it is desired to carry out the process in a continuous manner, the catalyst is placed in a reactor which is heated to the desired operating temperature and the pressure increased above atmospheric, if necessary. The aromatic compound and alkylating agent are flowed over the catalyst bed at a predetermined liquid hourly space velocity sufficient to effect alkylation. The effluent is continuously withdrawn and conventional separation means used to isolate the desired product.

Additionally, the composition of this invention with or without additional catalytic metals or other catalytic materials such as Y zeolite may be used as a hydrocracking catalyst. Typically, hydrocracking conditions include a temperature in the range of 400° to 1200° F. (204°–649° C.), preferably between 600° and 950° F. (316°–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about $0.1 \text{ hr}^{-1}$ to $15 \text{ hr}^{-1}$, preferably between about 0.2 and $3 \text{ hr}^{-1}$. Hydrogen circulation rates are in the range of 1,000 to 50,000 standard cubic feet (scf) per barrel of charge (189–8,888 std. $m^3/m^3$), preferably between 2,000 and 30,000 scf per barrel of charge (355–5333 std. $m^3/m^3$).

The following examples are presented in illustration of this invention and are not intended as undue limitations on the generally broad scope of the invention as set out in the appended claims.

EXAMPLE 1

In a 125 mL Parr Teflon Liner there were placed 4.8 g of $Ce(NO_3)_3 \cdot 6H_2O$ dissolved in 66 g of aluminum chlorhydrate (ACH) sol (or 50 wt. % solution) obtained from Reheis. The liner was placed in a Parr Reactor which was placed in an oven heated to 135° C. After 5 days the reactor was removed from the oven and the Ce-ACH isolated.

In a 3,000 mL, three neck round bottom flask equipped with a condenser, an overhead stirrer and a thermometer there were placed 2,100 g of deionized water and 137 g of Ce-ACH sol. The flask was heated to 95° C. and held there for 30 minutes, at which time 54 g of montmorillonite clay (obtained from American Colloid and identified as HPM-20) was added while stirring. The resultant slurry was heated at 95° C. for 1 hour at which time the clay was isolated by centrifugation. The clay was washed until chloride free and dried at 60° C. for 16 hours, followed by calcination at 600° C. for 2 hours. The clay had a $d_{001} = 26.5$ Å and a B.E.T. surface area of 550 $m^2/g$ indicating that it was pillared.

EXAMPLE 2

In a container a slurry was prepared by adding 40 g of calcined Ce-ACH pillared montmorillonite clay prepared per Example 1 to 200 g of water. The slurry was heated to 85° C. in a constant temperature bath and then 1.3 g of ammonium fluorosilicate (AFS) in 200 g of water was added dropwise while stirring. After the AFS was added, the slurry was kept at 85° C. for about 1 hour. The clay was next recovered by filtration, washed with 10 liters of deionized water and then calcined at 400° C. for 4 hours in a muffle oven.

EXAMPLE 3

In a container there were added 0.81 g of ammonium fluoride (NH4F) in 20 g of water and 20 g of calcined Ce-ACH pillared montmorillonite clay prepared as in Example 1. The resultant slurry was stirred and the water evaporated on a steam bath. The clay was then dried at 110° C. for 16 hours and then calcined at 400° C. for 4 hours.

EXAMPLE 4

A fluorided pillared Ce-ACH montmorillonite clay was prepared as per Example 2 except that 1.69 g of ammonium fluoride was used as the fluoride source.

EXAMPLE 5

A fluorided pillared Ce-ACH montmorillonite clay was prepared as per Example 2 except that 0.34 g of ammonium fluoride was used as the fluoride source.

EXAMPLE 6

A fluorided pillared Ce-ACH montmorillonite clay was prepared as per Example 3 except that 1.63 g of ammonium fluoride in 20 g of water was used.

EXAMPLE 7

The fluorided pillared Ce-ACH montmorillonite clays prepared in Examples 3-6 as well as several other clays were tested using the following heptene cracking test. The heptene cracking test uses an electrically heated reactor which is loaded with 125 mg of 40-60 mesh (420-250 microns) particles of the catalyst to be tested. The catalyst was dried in situ for 30 minutes at 200° C. using flowing hydrogen, and then subjected to a reduction treatment of 425° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow rate of 125 cc/min. The effluent gas stream was analyzed using a gas chromatograph in order to calculate weight percent cracked product. Cracked product is product that has a lower molecular weight than the starting 1-heptene hydrocarbon. The results of the heptene cracking test are presented in Table 2.

TABLE 2

| Heptene Cracking Activity of Various Fluorided Ce-ACH Montmorillonite Clays. | | | |
|---|---|---|---|
| Fluoride Compound | g Compound/ 20 g Clay | % Fluoride | Cracking Activity/ (% Conv) |
| ** | ** | ** | 3.7 |
| AFS | 1.30 | 1.49 | 25 |
| AFS | 2.60 | 2.92 | 61 |
| NH4F.HF | 0.34 | 0.63 | 16 |
| NH4F | 0.30 | 0.64 | 10 |
| NH4F | 0.78 | 0.90 | 15 |
| NH4F* | 0.81 | 2.30 | 39 |
| NH4F | 1.69 | 1.60 | 26 |
| NH4F* | 1.63 | 4.10 | 68 |

*Impregnated
**Unfluorided Ce-ACH montmorillonite

The results presented in Table 2 show that activity is dependent on the amount of fluoride on the pillar.

EXAMPLE 8

This example presents the preparation of a fluorided pillared clay in which the clay is fluorided. First, to a solution consisting of 27 g of NH4Cl in 500 g of deionized water, there were added 20 g of montmorillonite clay while vigorously stirring. The resultant slurry was stirred for 2 hours at room temperature and then washed until the supernatant is chloride free. Finally, the NH4-montmorillonite was dried at 100° C. for 16 hours.

In a beaker there were mixed 10 g of the NH4-montmorillonite clay prepared above and a solution containing 5 g of NH4F and 100 g deionized water. This slurry was placed in a Parr reactor and placed in an oven heated to 60° C. for 12 hours. The fluorided clay was recovered by centrifugation and washed with 5 liters of deionized water.

The fluorided montmorillonite clay was pillared with Ce-ACH pillars according to the procedure in Example 1. This clay was found to have 2.9 wt. % fluoride. Finally, this clay was tested for heptene cracking activity using the procedure of Example 7 and was found to have 12% cracking activity.

A comparison of this catalyst versus those of the invention shows that for the same amount of fluoride, the catalyst of this invention has 61% cracking. This indicates that fluoride is in different places on the two samples.

I claim as my invention:

1. A hydrocarbon conversion process comprising contacting a hydrocarbon feed under hydrocarbon conversion conditions with a catalyst to give a hydroconverted product, the catalyst comprising a smectite clay having the empirical formula

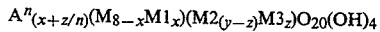

where A is a counter ion selected from the group consisting of alkali metals, alkaline earth metals, secondary amines, tertiary amines, quaternary ammonium cations and quaternary phosphonium cations, n is the charge on said counter ion, M is silicon or germanium, M1 is a metal having a +3 oxidation state selected from the group consisting of aluminum, gallium, iron and chromium, x ranges from about 0 to about 1.8, M2 is a metal having a +3 or a +2 oxidation state, M3 is a metal having a +2 or a +1 oxidation state, y is 4 when M2 is a +3 metal or 6 when M2 is a +2 metal and z varies from about 0 to about 1.8, the smectite clay having between its layers pillars which are metal fluoro hydroxy polymer cations.

2. The process of claim 1 where A is sodium, M is silicon, M1 is aluminum, M2 is aluminum, z is 0 and the composition has the x-ray diffraction pattern of beidellite.

3. The process of claim 1 where A is sodium, M is silicon, x is 0, M2 is aluminum, M3 is magnesium and the composition has the x-ray diffraction pattern of montmorillonite.

4. The process of claim 1 where the metal in the metal fluoro hydroxy polymer cation is selected from the group consisting of Al, Zr, Si/Al, Ti, and Cr.

5. The process of claim 4 where the metal is aluminum.

6. The process of claim 5 where the aluminum fluoro hydroxy polymer pillar is substituted with a rare earth metal.

7. The process of claim 6 where the rare earth metal is cerium.

8. The process of claim 1 where the hydrocarbon conversion process is alkylation.

9. The process of claim 1 where the hydrocarbon conversion process is hydrocracking.

* * * * *